United States Patent [19]
Edwards

[11] Patent Number: 5,184,840
[45] Date of Patent: Feb. 9, 1993

[54] HITCH PROTECTOR

[76] Inventor: Jerry A. Edwards, 140 SE. 99th, Portland, Oreg. 97216

[21] Appl. No.: 897,421

[22] Filed: Jun. 12, 1992

[51] Int. Cl.⁵ .............................................. B60D 1/60
[52] U.S. Cl. ................................... 280/507; 280/767
[58] Field of Search ............. 280/507, 511, 767, 491.2, 280/491.5, 475; 293/117

[56] References Cited

U.S. PATENT DOCUMENTS 3,271,050  9/1966  Saunders .............................. 280/507
3,889,981  6/1975  Westford .............................. 280/507

Primary Examiner—Charles A. Marmor
Assistant Examiner—Peter English
Attorney, Agent, or Firm—Robert L. Harrington

[57] ABSTRACT

A hitch protector for a vehicle hitch for protecting the vehicle hitch from impacting and rubbing against the surface of a roadway. The hitch protector is end mountable on the receiving socket of the vehicle hitch and is retained by a retention pin. Blocks strategically located on the framework of the hitch protector prevent the hitch protector from pivoting about the retention pin and thus maintain the hitch protector in the installed position. A roller mounted on the framework of the hitch protector is positioned below the hitch upon installation and prevents the end of the hitch from coming into contact with the ground surface. Forces resulting from the roller contacting the ground surface are transmitted to the reinforced end of the receiving socket of the hitch.

9 Claims, 1 Drawing Sheet

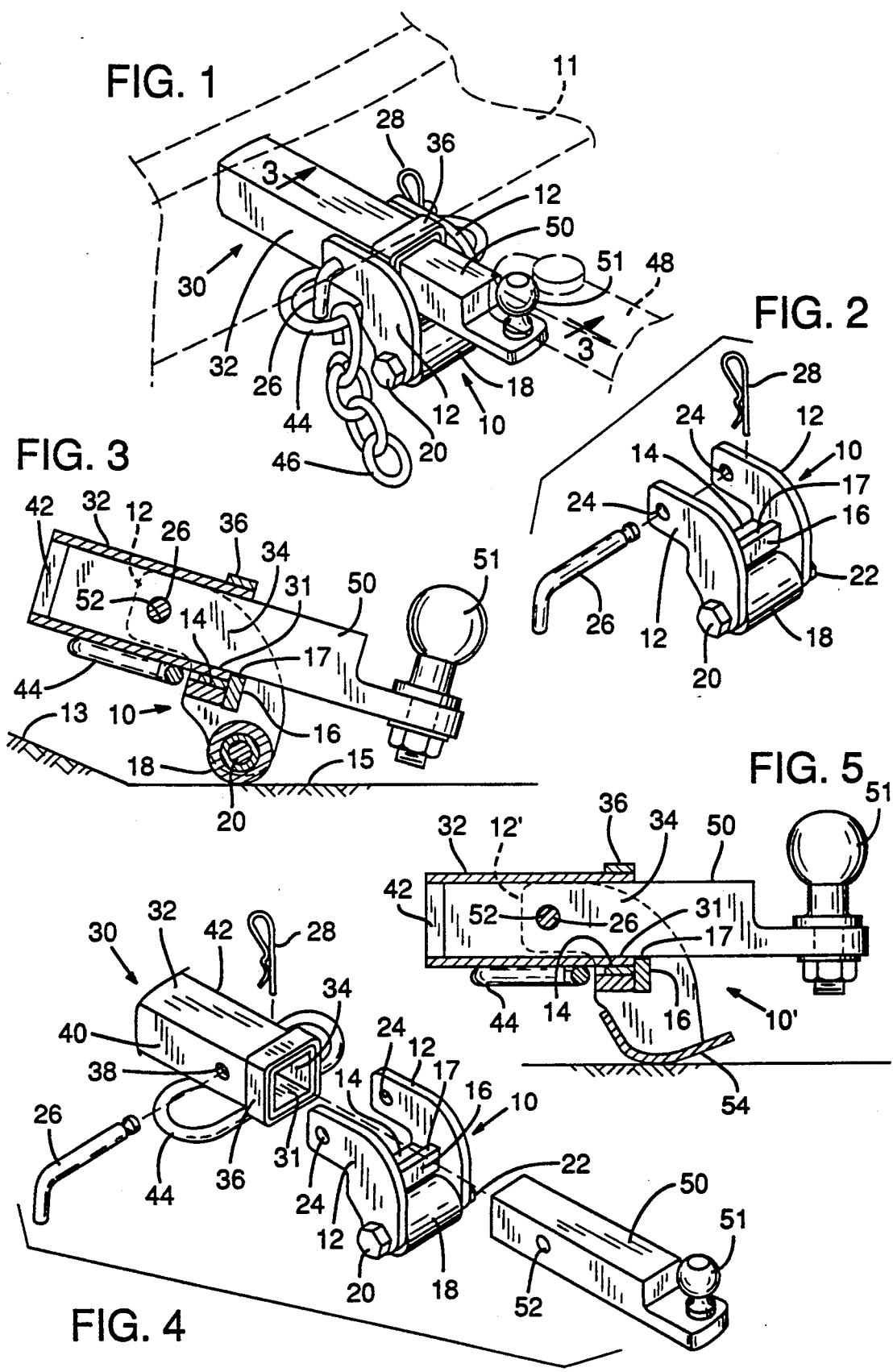

5,184,840

HITCH PROTECTOR

BACKGROUND INFORMATION

1. Field of the Invention

This invention relates to hitches for vehicles and in particular it relates to a protector to prevent damage to the vehicle mounted hitch under conditions where the hitch is impacted on the roadway.

2. Background of the Invention

Hitches are added to vehicles such as automobiles, pickups and the like to provide the capability of towing another vehicle such as a trailer, e.g., a recreational travel trailer.

A popular and well known hitch arrangement is the receiver-type hitch. A receiving bracket is permanently mounted to the frame of the towing vehicle and a hitch adapter is removably mounted to the bracket. The hitch is designed so that the receiving bracket does not extend appreciably beyond the rear of the vehicle. The bracket of the receiver-type hitch includes a socket, generally square in section, that will receive the hitch adapter. The hitch adapter serves to extend the hitch beyond the rear of the vehicle and also carries the connecting member, such as a ball, for attachment to the trailers hitch. The hitch adapter is retained in the socket of the receiving bracket by a retention pin. The end of the socket has a collar on its periphery that increases its strength for withstanding the impacts typically encountered by such hitches. Typically extending on each side of the socket are rigid loops or flat brackets with holes therethrough for attaching safety chains interconnected between the trailer and the towing vehicle.

One of the problems with hitches attached to vehicles is the possibility of the hitch (either the bracket or hitch adapter) bottoming out. That is, the hitch will impact and rub on the ground surface. Since most of the roadways traversed by vehicles are now paved with material such as asphalt or concrete, the impacting and rubbing of the hitch on the surface will cause excessive wear or damage to the hitch components. This is to be avoided. The bottoming of the hitch generally occurs when negotiating drive ways or entries that are inclined with respect to the roadway. As the front wheels of the towing vehicle traverse over the incline, the hitch will in effect be pivoted about the rear wheels toward the ground. The hitch will then come into contact with the ground surface and will scrape or rub on the ground.

Hitch protectors have been applied to the hitch to protect against such impacts. One type of hitch protector has a wheel or roller mounted between two parallel plates mounted to the receiving bracket. The plates are spaced sufficiently to span the width of the socket and is mounted to extend below the bracket. The hitch protector of this type is mounted on the hitch at the position of the retaining pin. This places the hitch protector at a distance forward from the end of the hitch that it is intended to protect and accordingly does not always protect the hitch end from impact.

As described above, the hitches are often designed with loops or plates with holes that are attached to the bottom or top of the receiving bracket and protrude laterally therefrom for attachment of safety chains. The typical hitch protector (extended below the receiving bracket) will not fit the hitches provided with such safety chain fixtures attached to the bottom of the hitch.

The preferred embodiment of a hitch protector of the present invention has side plates configured for attachment to a square tube type receiving bracket by the retention pin used for retaining the hitch adapter to the bracket. However, rather than being extended below the bracket at the position of the retention pin, they extend rearwardly alongside the square tube and thus above the safety chain fixture, back to the position of the collar, i.e., at the rear-end opening of the square tube. The configured plates project below the rear end of the bracket and a channel-shaped crossbar extends between the plates and across the lower edge or lip of the collar enforced rear end. The crossbar abuts the end and bottom of the collar but without restricting the opening into the square tube. A roller is mounted to the protector below the position of the crossbar.

The hitch protector described fits all known receiver-type hitches having safety chain fixtures above or below the receiving bracket. (None provide the fixture at the position of the re-enforcing collar.) Additionally, whereas the previous protectors transferred impacts to the retention pin, the protector of the present invention transfers the impact to the re-enforcing collar at the end of the receiving bracket.

Other advantages will be apparent from the following detailed description and drawings.

BRIEF DESCRIPTION OF THE DRAWINGS

FIG. 1 is a perspective view of the hitch protector of the present invention installed on a receiver-type hitch;

FIG. 2 is a perspective view of the hitch protector only of FIG. 1;

FIG. 3 is a view as viewed on view lines 3—3 of FIG. 1 but additionally showing the hitch protector in operation;

FIG. 4 is a an exploded perspective view showing the hitch protector and receiver-type hitch of FIG. 1; and FIG. 5 is a view of an alternate embodiment of a hitch protector of the present invention.

DESCRIPTION OF THE PREFERRED EMBODIMENT

FIG. 1 is illustrative of a receiver-type hitch as mounted to a vehicle including the receiving bracket 30 and hitch adapter 50. The receiver-type hitch is well known and therefore only the socket 32 of the receiving bracket 30 is shown in relation to a bumper 11 (in dash lines) on the rear end of a vehicle. The hitch protector 10 of the present invention is end mountable on the socket 32 and protects the socket from engagement with obstacles such as the surface of a roadway. As shown, a hitch 48 (in dash lines) of a towable vehicle (not shown) is connected to a ball 51 of the hitch adapter 50 and a safety chain 46 is connected to the safety chain loop 44. The hitch adapter 50 is received in the socket 32 of the receiver-type hitch, the adapter 50 and the hitch protector 10 being retained by the pin 26.

The hitch protector including the retention pin 26 is illustrated separately in FIG. 2 and in combination with a receiver-type hitch in FIGS. 1, 3 and 4. FIG. 3 provides a sectional view of the hitch protector 10 and its mounting arrangement with the receiving socket 32. It is shown in the condition where the vehicle is ascending an incline 13 relative to a horizontal roadway 15.

Referring to FIGS. 2 and 4, the hitch protector 10 has two shaped or configured side plates 12 that are maintained in a fixed parallel spaced relation by a crossbar including stop blocks 14 and 16 fixedly secured between the side plates 12 as by welding. The side plates 12 and the crossbar (14, 16) define the frame of the hitch protector 10. A roller 18, positioned near the lower ends of and between the side plates 12, is rotatably mounted on a shaft 20, such as a bolt. The shaft 20 (i.e., bolt) fits in bores provided (not in view) in the side plates 12. A retainer 22 (FIGS. 2 and 4), such as a self locking nut, is utilized to secure the bolt 20. The roller 18 has conventional bushings or bearings for free rotation of the roller on the bolt 20. Aligned apertures 24 are provided in each of the side plates 12 for receiving the retention pin 26. A conventional clip 28 is utilized to secure the pin 26 in its installed position.

Refer now to the exploded view of FIG. 4. Only the socket 32 of the receiving bracket 30 is shown. The receiving bracket is of known construction and has framework suited for mounting to a variety of vehicles. The socket 32 is supported on the framework. The socket 32 is of tubular construction, most often square in section, and has an opening 34 for receiving a hitch adaptor 50. The end of the socket 32 has a reinforcing collar 36 fixedly attached to its periphery as by welding. The collar 36 is mounted flush with the end of the socket 32 and is provided for added strength. Aligned bores 38 are provided in the side walls 40, 42 (bore 38 in wall 42 is out of view) of the socket 32 for receiving the retention pin 26. A formed loop 44, e.g., a curved steel rod, extends on each side of the socket 32 and is secured to the underside of the socket 32 as by welding. The socket 32 is thus configured to receive the hitch adapter 50 in the opening 34. The hitch adapter 50 has a through bore 52 that will align with the bores 38 of the socket 32 when the adapter 50 is installed in the socket 32.

The exploded view of FIG. 4 shows the socket 32, the hitch protector 10 and the hitch adapter 50. The hitch adapter 50 is of a dimension to fit closely within the opening 34 of the socket 32 and upon installation in the opening 34 will have bore 52 aligned with the bores 38 of the socket. The hitch protector 10 is end mounted on the socket 32 with the socket 32 received between the side plates 12 of the hitch protector 10. The apertures 24 in the side plates 12 will be aligned with bores 38 of the socket 32 upon installation. A retaining pin is inserted in the aligned apertures 24, bores 38 and bore 52 to retain the hitch adapter 50 and the hitch protector 10 in the installed position as illustrated in FIGS. 1 and 3. The clip 28 is utilized to retain the pin 26 in position.

As shown in FIGS. 1, 2, and 4 the plates 12 of the hitch protector 10 are in a spaced relation to span the width of the end of the socket 32 defined by the reenforcing collar 36. The hitch protector 10 (as best seen in FIGS. 1 and 3) is end mounted on the socket 32 with the stop block 16 in abutment with both the end of the socket 32 and collar 36 (Recall that the collar 36 is mounted flush with the end of the socket 32). The top surface 17 of the stop block 16 is flush with the interior bottom surface 31 of the socket 32 and therefore will not interfere with the insertion of the hitch adapter 50 into the opening 34 of the socket 32. The stop block 14 is in abutment with the surface of the collar 36 on the underside of the socket 32 and is preferably of a width so as not to interfere with any type of safety chain bracket affixed to the underside of the socket 32. The stop block 16 in abutment with the end of the socket 32 will prevent the hitch protector 10 from pivoting downward about the pivot axis defined by the pin 26 installed in the aligned apertures 24, bores 38 (as viewed in the figures) and the stop block 14 in abutment with the collar 36 will prevent the hitch protector 10 from pivoting upward. As the roller 18 of the hitch protector 10 contacts an obstacle, such as a ground surface 15 when the vehicle traverses a driveway 13 as shown in FIG. 3, the roller 18 acts as a transport wheel to maintain the end of the socket above the obstacle and the force resulting from the roller 18 engaging the obstacle will be transmitted to the reenforced end (collar 36) of the socket 32 via the stop block 14. (As an alternative description, the bottom edge of the reinforced end of the socket 32 provides a rear-end lip that is engaged by the channel-shaped crossbar as defined by stop blocks 14, 16.)

Refer now to FIG. 5 of the drawings which illustrates another embodiment of a hitch protector 10'. The hitch protector 10' is constructed in the same manner as the hitch protector 10 illustrated in FIGS. 1-4 except that the roller 18 is replaced by a skid plate 54 that is mounted to the plates 12'. The skid plate 54 will be below the socket 32 upon installation of the hitch protector 10' on the socket 32 and thus will protect the end of the socket 32 in the same manner as the roller 18.

It will be apparent to those skilled in the art that modifications and variations may be made without departing from the true spirit and scope of the invention. The alternate embodiment of FIG. 5 is one example of a modification and variation from the preferred embodiment. Others include the positional placement of the blocks 14, 16, the size and width of the roller 18, and the shape of the side plates 12. These examples are not to be considered all inclusive of the modifications and variations that may be made. The invention is therefore not to be limited to the illustrated and described embodiments but is to be determined by the appended claims.

What is claimed is:

1. A device for protecting the end of a receiver-type hitch from engagement with an obstacle, a socket of said hitch having an opening for receiving a hitch adapter and aligned bores for receiving a retention pin, said device comprising:
   a pair of side plates each having retention pin receiving apertures near one end;
   a stop block affixed to and between said side plate pair, said side plates and said stop block defining a frame;
   a roller rotatably mounted to said frame and positioned between said side plates at an end opposite said pin receiving apertures;
   said frame end mountable on an end of said socket with said pin receiving apertures aligned with said aligned bores and said roller juxtaposed below the end of said socket;
   a retention pin insertable in the aligned apertures and bores for retaining said frame to said socket; and,
   whereby said roller of said frame protects the end of said socket from engagement with an obstacle.

2. A hitch protector for a trailer hitch including a bracket having a rearmost end defined by a rear-end lip, said bracket further having a determined height and fixedly attached to the rear end of a vehicle, and a support member secured to the bracket at a position forward of the rearmost end of the bracket, said member extended laterally from the bracket and interfering with bottom mounting of a hitch protector to the bracket, said hitch protector comprising:
   a pair of configured plates each having an elongate portion extending from a forward end to a rearward end and a depending portion at the rearward end of the elongate portion, said elongate portion having a height conforming to the height of the hitch bracket and adapted to extend along the side of said bracket in overlapping relation with the position of the support member, with the depending portion positioned rearward of the member position at the rearmost end of the bracket, and a channel-shaped crossbar extended between the depending portions of said configured plates and adapted to engage the rear-end lip of the bracket, said depending portions of said configured plates extending below said crossbar and an impact receiving member extended between said depending portions below said crossbar whereby upon the rear end of the vehicle being projected toward a roadway, the impact receiving member is impacted by said roadway and transmits the force of the impact to the rear-end lip of the bracket engaged by said crossbar.

3. A hitch protector for a trailer hitch as defined in claim 2 wherein the bracket is a square tube having a rear-end opening and a reinforcing collar surrounding said rear-end opening and providing at its bottom edge said rear-end lip, and a hitch adapter slidably received in said open end of said square tube and secured therein by a retaining pin projected through aligned openings in the sides of said square tube and through an aperture in said hitch adapter, said hitch protector further comprising;

said side plates having aligned openings that are aligned with the openings in said sides of said square tube with the elongate portions thereof extended along the tube sides, and said crossbar abutted against the bottom and rear end of said rear-end lip without restricting the rear-end opening of said tube.

4. A hitch protector as defined in claim 3 wherein the impact receiving member includes a skid plate projected below the depending portions of the said side plates for receiving the impact of the roadway.

5. A hitch protector as defined in claim 3 wherein the impact receiving member includes a rotatably mounted roller projected below the depending portions of said plates for receiving the impact of the roadway.

6. A combination hitch and hitch protector comprising:

a hitch including a receiving bracket configured into a square tube having, top, bottom and opposed sides and an open rear end defined by top, bottom and opposed side edges, aligned openings through the sides at a determined distance forward of said open rear end, and safety chain fixtures affixed to the bottom of said tube and projected laterally past the sides of said tube, and a hitch adapter slidably received in said open rear end with a transverse opening therethrough aligned with the openings in said tube sides, and a retaining pin projected through said aligned openings for securing said hitch adapter to said tube, and the improvement which comprises;

a hitch protector including a pair of configured plates, said plates each including an elongate portion extended along the opposed sides and overlying said aligned openings therein, said elongate portions having openings aligned with said openings in the tube sides and said retaining pin extended through the openings of said elongate portion for fastening the hitch protector to the receiving bracket, said elongate portion extended rearwardly to the open end of said tube and a depending portion extended downwardly from said elongate portion at said open end, a channel-shaped crossbar extending between said configured plates and abutting said bottom rear-end edge of said square tube without restricting the open end thereof and an impact receiving member extended between said depending portions of said configured plates and positioned below said crossbar to absorb the impact imparted to the hitch when projected toward a roadway.

7. A combination hitch and hitch protector as defined in claim 6 wherein said open end of the square tube is further defined by a reinforcing collar surrounding said top, bottom and opposed side edges, said bottom edge providing a lip having a bottom face and a rear face and said crossbar of said hitch protector having a vertical stop block abutting the rear face of the lip and a horizontal stop block abutting the rear face to thereby prohibit pivoting of the hitch projector about said retaining pin connection.

8. A combination hitch and hitch protector as defined in claim 7 wherein said impact receiving member is a roller rotatably mounted between said plates.

9. A combination hitch and hitch protector as defined in claim 7 wherein said impact receiving member is a skid plate fixedly attached between said plates and projected below said plates.

* * * * *